J. A. BURNS.
IMPLEMENT HOLDER FOR COOKING UTENSILS.
APPLICATION FILED SEPT. 4, 1919.
1,327,982.
Patented Jan. 13, 1920.
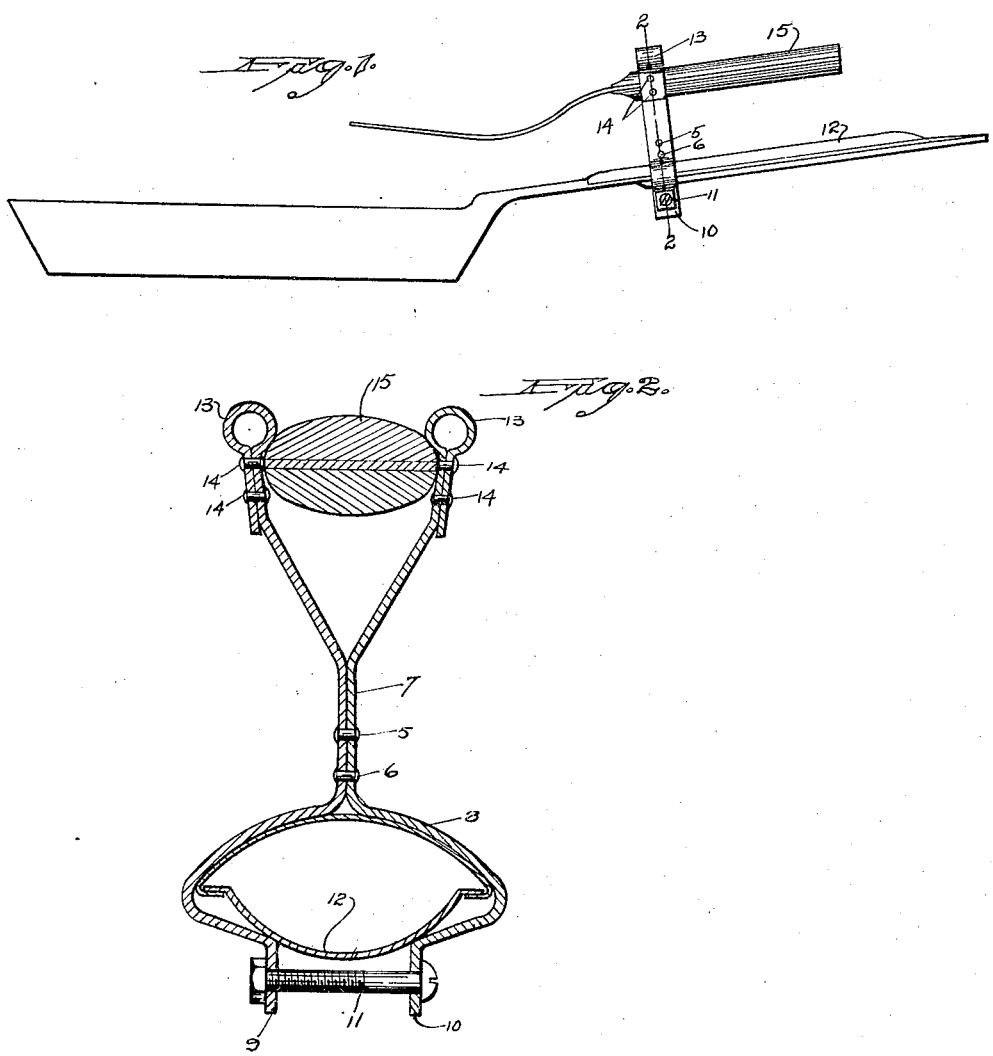

UNITED STATES PATENT OFFICE.

JOHN A. BURNS, OF WEST HAVEN, CONNECTICUT, ASSIGNOR OF ONE-HALF TO CHRISTIAN GINTER, JR., OF NEW HAVEN, CONNECTICUT.

IMPLEMENT-HOLDER FOR COOKING UTENSILS.

1,327,982.  Specification of Letters Patent.  Patented Jan. 13, 1920.

Application filed September 4, 1919. Serial No. 321,671.

*To all whom it may concern:*

Be it known that I, JOHN A. BURNS, a citizen of the United States, residing at West Haven, in the county of New Haven and State of Connecticut, have invented a new and useful Improvement in Implement-Holders for Cooking Utensils; and I do hereby declare the following, when taken in connection with the accompanying drawings and the characters of reference marked thereon, to be a full, clear, and exact description of the same, and which said drawings constitute part of this application, and represent, in—

Figure 1 a side view of a cooking utensil provided with an implement holder constructed in accordance with my invention.

Fig. 2 a sectional view on the line 2—2 of Fig. 1.

This invention relates to an improvement in implement holders for cooking utensils, and particularly for utensils having a long handle, such, for instance, as frying pans, sauce pans, etc., the object of the invention being to provide a clip adapted to be readily applied to a handle and arranged to support a fork, spoon, or other implement; and the invention consists in the construction hereinafter described and particularly recited in the claim.

In carrying out my invention, I form the holder from two strips of metal secured together between their ends by rivets 5 and 6, more or less in number, forming a shank 7. The lower ends of the strips are bowed downwardly outward, downwardly inward, and then downward forming a clamp 8 the ends 9 and 10 being perforated for the reception of a screw or bolt 11 by which the yoke may be clamped around the handle 12 of a frying pan, sauce pan, or other utensil. Above the shank the ends are expanded, rolled to form ribs 13 and the ends turned downwardly and secured to the sides of the strips by rivets 14, more or less in number so as to form a clip. This clip is adapted to receive the handle 15 of a fork, spoon or other implement which it is desired to support in connection with a cooking utensil. The sides of the clip are yielding so that the handle may be readily inserted or removed and the ribs 13 form stops to hold the handle in position and frictionally grip the same. The clamp at the lower end is readily adapted to conform to the configuration of the handle, and the sides of the clip will yield to hold an implement having a larger or smaller handle, as the case may be. This device is readily applied to any cooking utensil having an arm like handle, and provides means for supporting the implement so as to be convenient for use as occasion may require.

I claim:—

As a new article of manufacture, an implement-holder for application to the handles of cooking utensils, the said holder comprising two complementary strips of spring metal fastened together midway of their ends to form a rigid stem, having their lower ends bent outwardly and inwardly to form a handle-clip and their extremities perforated for the reception of a clamping-bolt, and the upper ends of the said strips being bent divergently to form yielding gripping-arms for the reception of the handle of a cooking implement between them, the extremities of the upper ends of the strips being folded upon themselves for the production of handle-retaining ribs which grip the handle and hold it against deflection with respect to the device.

In testimony whereof, I have signed this specification in the presence of two subscribing witnesses.

JOHN A. BURNS.

Witnesses:
 MAY BURNS,
 HENRY GINTER.